(12) United States Patent
Mayya et al.

(10) Patent No.: US 9,237,103 B2
(45) Date of Patent: Jan. 12, 2016

(54) CONGESTION ALLEVIATION IN NETWORK SYSTEMS

(75) Inventors: Deepak Srinivas Mayya, Fremont, CA (US); Rajesh L G, Bangalore (IN); Saket Jain, New Delhi (IN); Prashant Chandrashekhar Pathak, Bangalore (IN); Lalit Kumar, Fremont, CA (US); Ranganathan Rajagopalan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 808 days.

(21) Appl. No.: 13/435,023

(22) Filed: Mar. 30, 2012

(65) Prior Publication Data

US 2013/0258850 A1 Oct. 3, 2013

(51) Int. Cl.
*H04L 12/26* (2006.01)
*H04L 12/801* (2013.01)
*H04L 12/841* (2013.01)
*H04L 12/835* (2013.01)
*H04L 12/823* (2013.01)

(52) U.S. Cl.
CPC .............. *H04L 47/12* (2013.01); *H04L 47/28* (2013.01); *H04L 47/30* (2013.01); *H04L 47/32* (2013.01); *H04L 47/17* (2013.01); *H04L 47/39* (2013.01)

(58) Field of Classification Search
CPC ...................................... H04L 47/12

USPC .......................................................... 370/235
See application file for complete search history.

(56) References Cited

U.S. PATENT DOCUMENTS

| 6,418,118 | B1 * | 7/2002 | Hay et al. ........................ 370/230 |
| 7,433,904 | B1 * | 10/2008 | Burns et al. |
| 8,018,851 | B1 * | 9/2011 | Medina et al. ................ 370/235 |
| 8,391,144 | B1 * | 3/2013 | Pannell et al. ................ 370/230 |
| 2003/0126223 | A1 * | 7/2003 | Jenne et al. .................... 709/212 |
| 2009/0182490 | A1 * | 7/2009 | Saunders ....................... 701/114 |
| 2010/0244563 | A1 * | 9/2010 | Fleck .............................. 307/35 |
| 2011/0310739 | A1 * | 12/2011 | Aybay ............................ 370/235 |
| 2013/0258851 | A1 | 10/2013 | Mayya et al. |

OTHER PUBLICATIONS

U.S. Appl. No. 13/435,350, filed Mar. 30, 2012, Mitigation of Congestion Due to Stuck Ports in Network Systems.
"U.S. Appl. No. 13/435,350, Non Final Office Action mailed Mar. 29, 2013", 11 pgs.

* cited by examiner

*Primary Examiner* — Robert Wilson
*Assistant Examiner* — Nourali Mansoury

(57) ABSTRACT

In one embodiment, a method is provided for alleviating congestion in a network system. In this method, the receipt of data packets destined for a destination apparatus is detected. Flow control signals are also received with each flow control signal corresponding to a data packet. Various time periods are tracked with each time period being between the detection of the receipt of a data packet and the receipt of tracked corresponding flow control signal. An average of the time periods is calculated and this average is compared to a threshold. One or more data packets are dropped in reference to the comparison.

20 Claims, 7 Drawing Sheets

CONGESTION ALLEVIATION IN NETWORK SYSTEMS

FIELD

The present disclosure relates generally to communication systems.

BACKGROUND

Data packets are transmitted within a network system, such as a Fibre Channel network. To prevent a recipient device (e.g., a storage server) from being overwhelmed with incoming data packets, many network systems provide flow control mechanisms based on, for example, a system of buffer-to-buffer credits. Each buffer-to-buffer credit represents the ability of a recipient device to accept additional data packets. If a recipient device issues no credits to the sender, the sender cannot send any additional data packet. This control of the data packet flows based on buffer-to-buffer credits helps prevent the loss of data packets and also reduces the frequency of need of data packets to be retransmitted across the network system. It should be appreciated that switches that connect various network segments in the network system buffer all incoming data packets. In particular, data packets from input queue are transferred to egress queue through a loss arbitration system. When a recipient apparatus is slow, this egress queue becomes full, which can result in the ingress queue becoming full too. Such data packets consume all buffer-to-buffer credits causing blocking of flows destined to other recipient apparatuses.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method is provided for alleviating congestion in a network system. In this method, the receipt of data packets destined for a destination apparatus is detected. Flow control signals are also received with each flow control signal corresponding to a data packet. Various time periods are tracked with each time period being between the detection of the receipt of a data packet and the receipt of tracked corresponding flow control signal. An average of the time periods is calculated and this average is compared to a threshold. One or more data packets are dropped in reference to the comparison.

Example Embodiments

Figure 1:
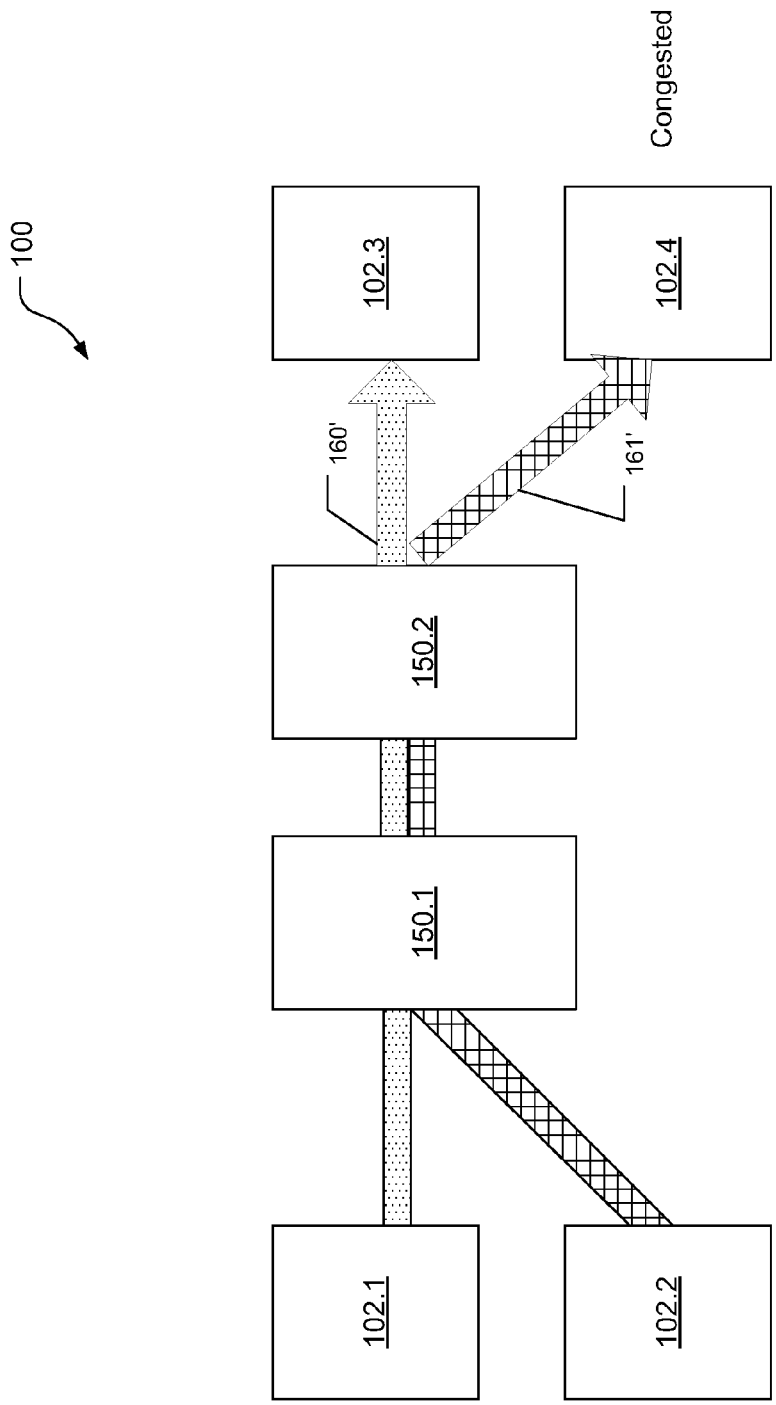
FIG. 1 is a block diagram depicting a network system for communicating data packets, in accordance with an example embodiment.

FIG. 1 is a block diagram depicting a network system 100 for communicating data packets, in accordance with an example embodiment. The network system 100 includes edge apparatuses 102.1-102.4 and switching apparatuses 150.1-150.2. In one example, the network system 100 can be a storage area network (SAN), which is a high-speed network that enables establishment of direct connections between storage system and its storage devices. The SAN may thus be viewed as an extension to a storage bus and, as such, an operating system of storage system enables access to stored data using block-based access protocols over an extended bus. In this context, the extended bus can be embodied as Fibre Channel, Computer System Interface (SCSI), Internet SCSI (iSCSI) or other network technologies.

As depicted, the edge apparatuses 102.1 and 102.2 are transmitting data packets 160' and 161' to edge apparatuses 102.3 and 102.4, respectively, by way of switching apparatuses 150.1 and 150.2. As explained in detail below, the switching apparatuses 150.1 and 150.2 are computer networking apparatuses that connect various network segments. In this example, the flow of packets 161' to edge apparatus 102.4 is congested because, for example, this particular edge apparatus 102.4 cannot process the data packets as fast as the packets are received. However, this congestion associated with edge apparatus 102.4 can negatively affect the flow of data packets to other edge apparatuses as well, such flow of data packets 160' to edge apparatus 102.3.

In particular, congestion can affect other flows because of how flow control signals are buffered in the network system 100. In general, flow control refers to stopping or resuming transmission of data packets. A "flow control signal," as used herein, refers to a signal transmitted between two apparatuses to control the flow of data packets between each other. An example of a flow control signal is a pause command (or pause frame) used in Ethernet flow control. It should be appreciated that pause command signals the other end of the connection to pause transmission for a certain amount of time, which is specified in the command.

Another example of a flow control signal is a buffer-to-buffer credit used in Fibre Channel flow control. A "buffer-to-buffer credit," as used herein, identifies a number of data packets that are allowed to accumulate on a destination apparatus. Particularly, in buffer-to-buffer credit control, two connected apparatuses in the network system 100 (e.g., switching apparatus 150.2 and edge apparatus 102.4 or switching apparatuses 150.1 and 150.2) set a number of unacknowledged frames allowed to accumulate before a sending apparatus, which initiates transmission, stops sending data to a destination apparatus, which receives the frames. It should be appreciated that a "frame," refers to a data packet that includes frame synchronization. Thus, in effect, a frame is a data packet and therefore, the terms may be used interchangeably.

A counter at the sending apparatus keeps track of a number of buffer-to-buffer credits. Each time a frame is sent by the sending apparatus, the counter increments by one. Each time the destination apparatus receives a frame, it sends an acknowledgement back to the sending apparatus, which decrements the counter by one. If the number of buffer-to-buffer credits reaches a maximum limit, the sending apparatus stops transmission until it receives a next acknowledgement from the destination apparatus. As a result, the use of such buffer-to-buffer credit mechanism prevents loss of frames that may result if the sending apparatus races too far ahead of a destination apparatus's ability to process the frames.

It should be appreciated that buffer-to-buffer credit limit reaching a maximum is equivalent to receiving a pause command, which is described above. In Ethernet flow control, an edge device 102.4, which processes data packets slower than switching apparatus 150.2, causes the output queue in the switching apparatus 150.2 to fill up. As a result, in a system with lossless arbitration scheme, the input queue in the switching apparatus 105.2 is also filled up. When the input queue fills up, the switching apparatus 105.2 flow controls switching apparatus 150.1 that causes congestion for all the flows destined to switching apparatus 150.2.

Figure 2:
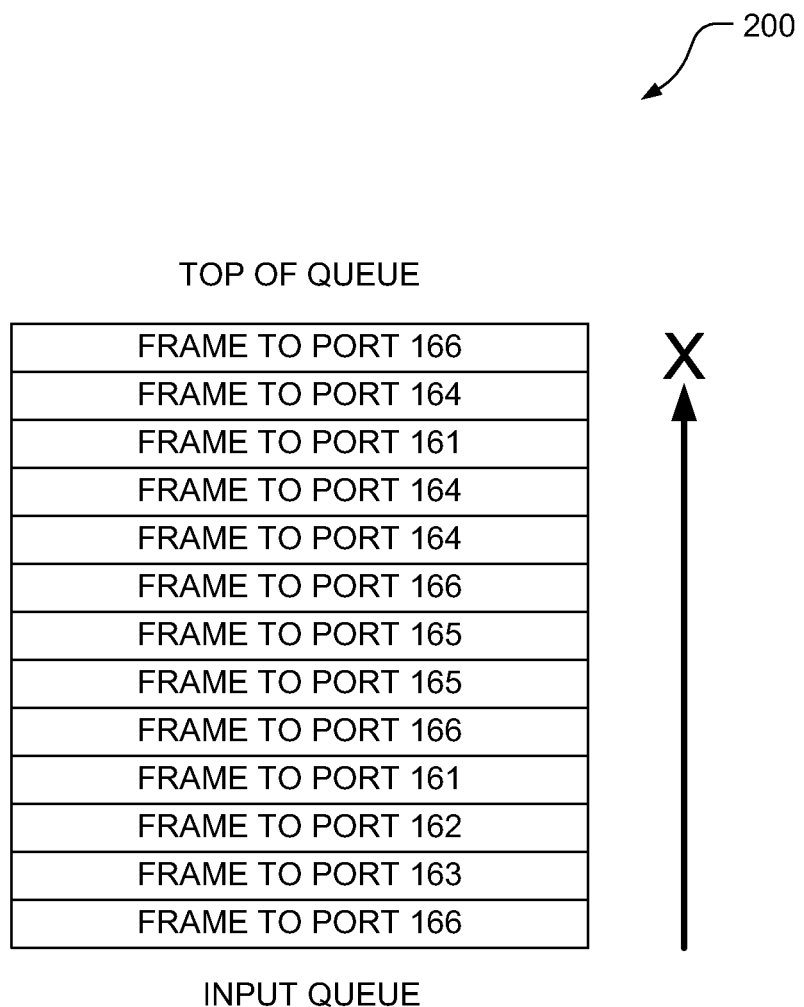
FIG. 2 depicts an example of an output queue included in a switching apparatus, such as the switching apparatus depicted in FIG. 1.

FIG. 2 depicts an example of an output queue 200 included in a switching apparatus, such as the switching apparatus 150.1 depicted in FIG. 1. In reference to FIG. 2, this output queue 200 is configured to buffer frames outputted to various ports, such as ports 161-166. As used herein, a "port" refers to a logical channel or channel endpoint in a network system. For example, a Fibre Channel port is a hardware pathway into and out of a node that performs data communications over a Fibre Channel link.

Given that the output queue 200 buffers all frames to multiple ports 161-166, in the event of a congestion of an output port, all the buffered frames behind the congested port are blocked or delayed. For example, port 166 is destined to an apparatus that processes its data packets slower than the other destination apparatuses. Thus, a flow of frames to port 166 becomes congested and therefore, the transmission of other frames to the same port 166 as stored in the output queue 200 is delayed. However, all the frames to other ports 161-165 are also stored and queued in the output queue 200, but cannot move up in the queue until the top of the queue, which includes frame to port 166, has been cleared. Thus, as depicted in FIG. 2, the delay in clearing frames to port 166 from the output queue 200 also delays or blocks transmission of frames to other ports 161-165.

Figure 3:
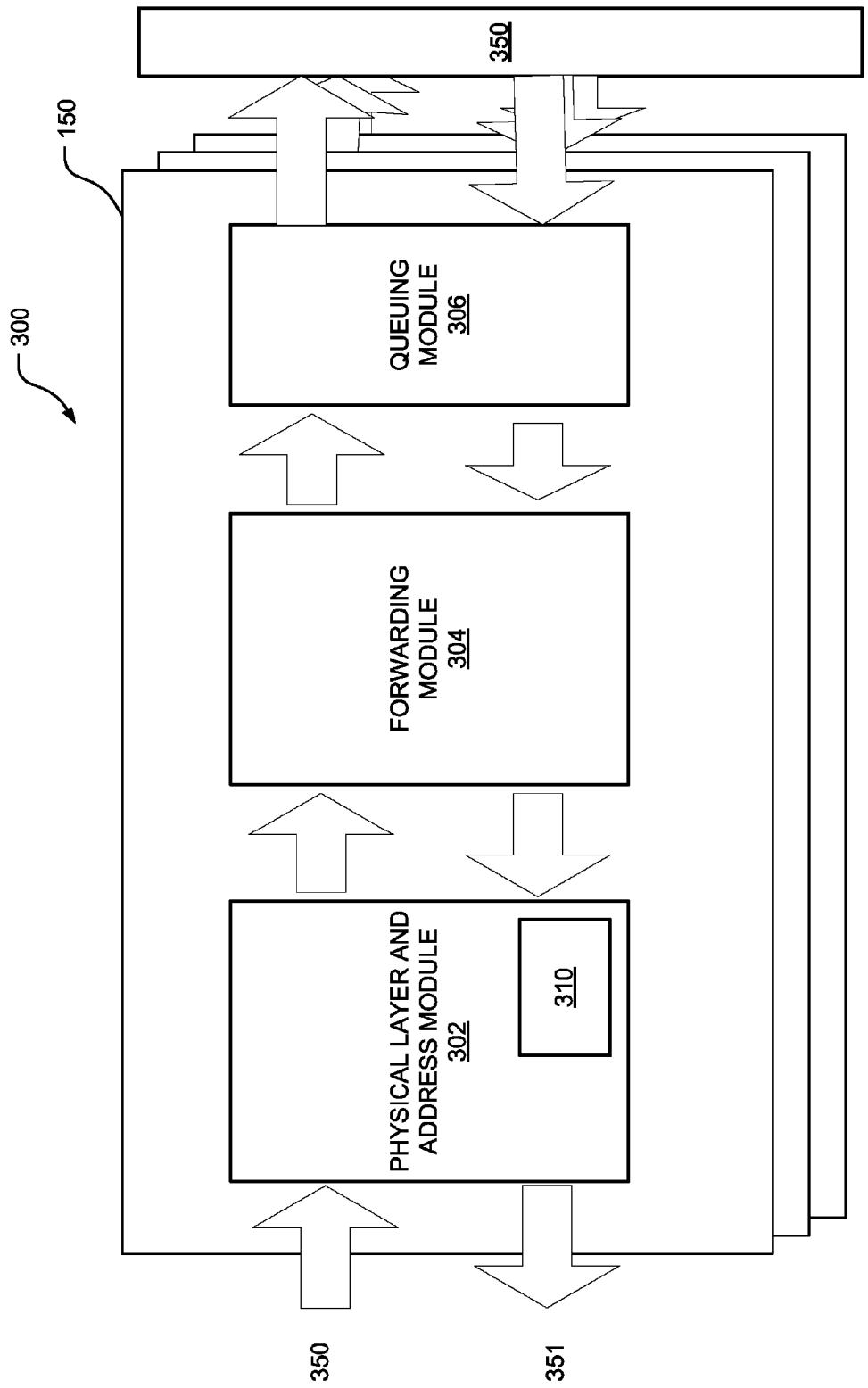
FIG. 3 is a block diagram illustrating an example embodiment of a system of switching apparatuses that is configured for congestion control in a network system.

FIG. 3 is a block diagram illustrating an example embodiment of a system 300 of switching apparatuses (e.g., switching apparatus 150) that is configured for congestion control in a network system. It should be appreciated that this embodiment of the switching apparatus 150 may be included in, for example, the network system depicted in FIG. 1. Referring back to FIG. 3, in various embodiments, the switching apparatus 150 may be used to implement computer programs, logic, applications, methods, or processes to control congestion in a network system, as described in detail below.

The switching apparatus 150 is a device that channels incoming data packets 350 from multiple input ports to one or more output ports that forward the output data packets 351 toward their intended destinations. For example, on an Ethernet local area network (LAN), the switching apparatus 150 determines which output port to forward each incoming data packet 350 based on the physical device address (e.g., Media Access Control (MAC) address). In a Fibre Channel network, data packets are forwarded based on a Fibre Channel destination index. In an Open Systems Interconnection (OSI) communications model, the switching apparatus 150 performs the Layer 2 or Data-link layer function. In another example, the switching apparatus 150 can also perform routing functions associated with Layer 3 or network layer functions in OSI.

In this embodiment, the switching apparatus 150 includes a physical layer and address module 302, a forwarding module 304, a queuing model 306, and a crossbar module 350. In general, the physical layer and address module 302 converts, for example, optical signals received into electrical signals, and sends the electrical stream of bits into, for example, the MAC, which is included in the physical layer and address module 302. The primary function of the MAC is to decipher Fibre Channel data packets from the incoming bit stream. In conjunction with data packets being received, the MAC communicates with the forwarding and queuing modules 304 and 306, respectively, and issues return buffer-to-buffer credits to the sending apparatus to recredit the received data packets. Additionally, as explained in detail below, the physical layer and address module 302 includes port logic module 310 that, as one of its function, is configured for congestion control.

The forwarding module 304 is configured to determine which output port on the switching apparatus 150 to send the incoming data packets 350. The forwarding can be based on a variety of lookup mechanisms, such as per-virtual storage area network (VSAN) forwarding table lookup, statistics lookup, and per-VSAN Access Control Lists (ACL) lookup.

The queuing module 306 is primarily configured to schedule the flow of data packets through the switching apparatus 150. As described above, queuing module 306 provides frame buffering for queuing of received data packets. In one embodiment, as explained in detail below, the port logic module 310 can provide instructions related to congestion control to the queuing module 306.

Additionally, system 300 depicts multiple switching apparatuses, each of which can be linked together by the crossbar module 350. In this system 300, data packets can be transferred from the input queue to the output queue through the crossbar module 350 by way of a lossless arbitration mechanism.

It should be appreciated that in other embodiments, the switching apparatus 150 may include fewer or more modules apart from those shown in FIG. 3. The modules 302, 304, 306, and 310 may be in the form of firmware that is processed by application specific integrated circuits (ASIC), which may be integrated into a circuit board. Alternatively, the modules 302, 304, 306, and 310 may be in the form of one or more logic blocks included in a programmable logic device (e.g., a field programmable gate array). The described modules 302, 304, 306, and 310 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
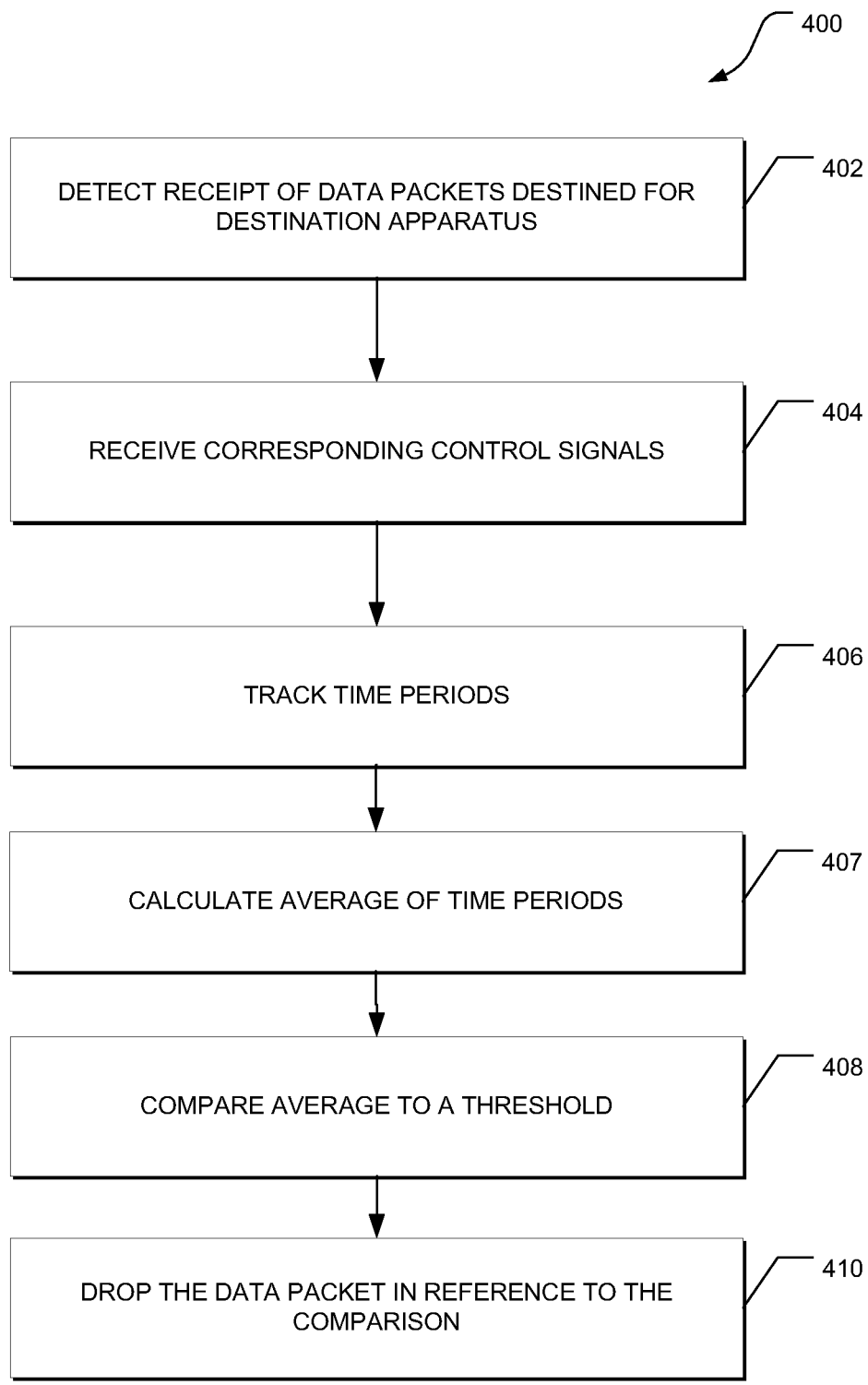
FIG. 4 is a flow diagram of a general overview of a method, in accordance with an example embodiment, for alleviation of congestion in a network system.

FIG. 4 is a flow diagram of a general overview of a method 400, in accordance with an example embodiment, for alleviation of congestion in a network system. In an example embodiment, the method 400 may be implemented by the port logic module 310 employed in the switching apparatus 150 depicted in FIG. 3.

As depicted in FIG. 4, the port logic module detects receipt of data packets, at 402, that are destined for or to be forwarded to a destination apparatus. In one embodiment, the port logic module can make such a detection by detecting whether the data packets are stored in an output queue.

In addition, the switching apparatus also receives, at 404, various flow control signals from the same destination apparatus. Each control signal corresponds to at least one data packet. Here, a time has elapsed between the detection of receipt of each data packet and receipt of a corresponding flow control signal. The port logic module, at 406, tracks each time period between the detection of the receipt of the data packet and the receipt of its corresponding flow control signal. With multiple time periods, the port logic module, at 407, then calculates an average of the time periods. As used herein, an "average" of a list of numbers is a single number that is meant to typify the numbers in the list. Examples of averages include arithmetic mean and weighted mean.

With the calculated average, the port logic module then compares the average to a certain threshold at 408. This threshold can be a time value (e.g., in milliseconds), which may be predefined by a user based on a length of a cable (e.g., Fibre Channel cable) connecting the switching apparatus to the destination apparatus. The threshold can be based on the length because the transit time for a data packet to be communicated from the switching apparatus to the destination apparatus depends on the length of the cable and therefore, the port logic module needs to be provided a certain threshold to account for the transit time.

Once the comparison is made, the port logic module, at 410, may drop one or more data packets or forward the data packets in reference to the comparison. For example, the port logic module may drop the data packet if the average exceeds the threshold, but continue to forward the data packet if the average falls below the threshold. In one embodiment, as explained in detail below, the port logic module can drop the data packets at the output queue. In an alternate embodiment, as also explained in more detail below, the data packets can also be dropped at the input queue.

Figure 5:
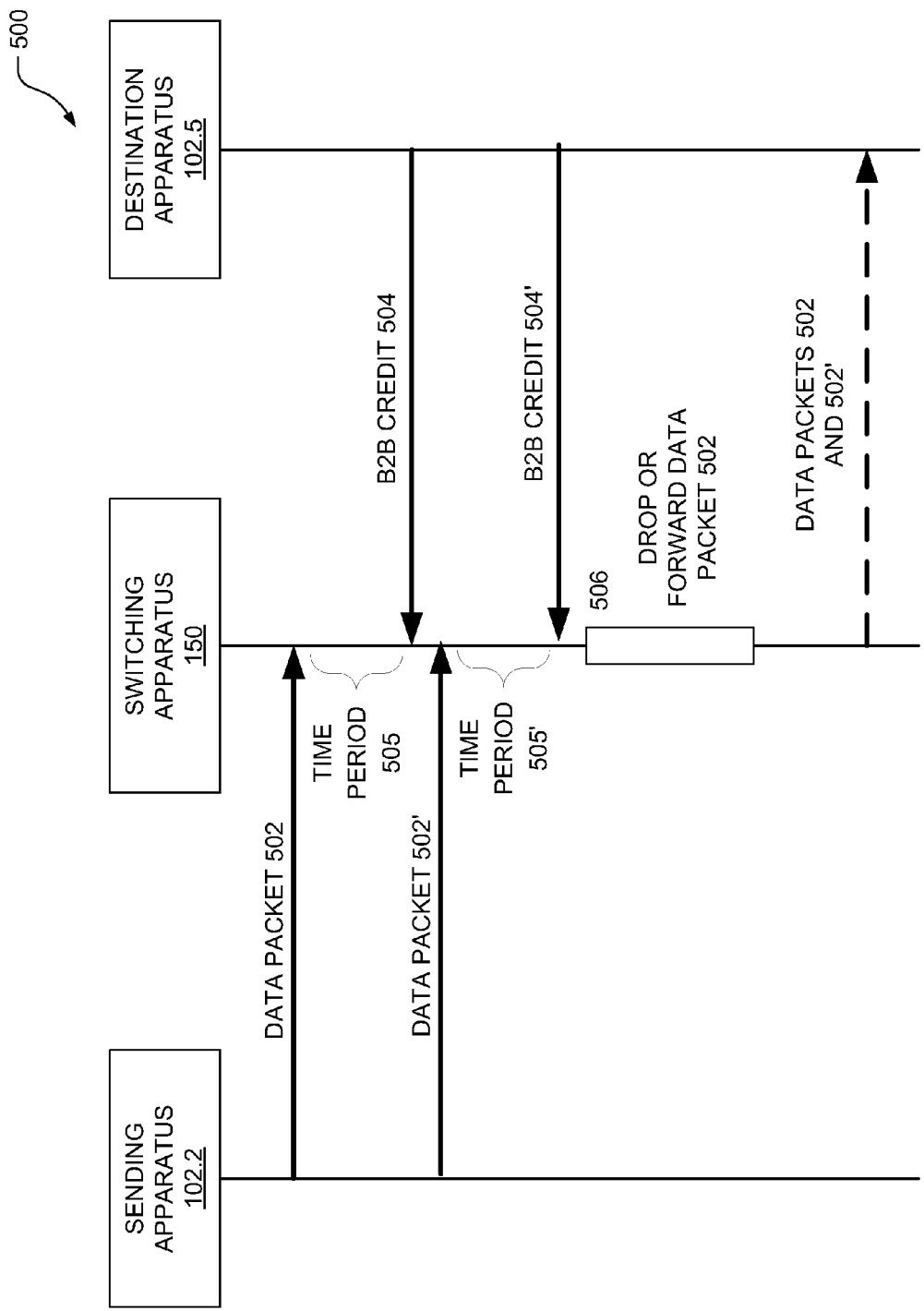
FIG. 5 is a timing diagram depicting various data transmitted between components in a Fibre Channel network system that supports congestion alleviation, in accordance with an example embodiment.

FIG. 5 is a timing diagram depicting various data transmitted between components 102.2, 150, and 102.5 in a Fibre Channel network system 500 that supports congestion alleviation, in accordance with an example embodiment. In this example, the network system 500 includes a sending apparatus 102.2, a switching apparatus 150, and a destination apparatus 102.5. The sending apparatus 102.2 transmits a data packet 502 associated with a particular port to the destination apparatus 102.5 by way of the switching apparatus 150. After receipt of the data packet 502, the switching apparatus 150 then receives a buffer-to-buffer credit (B2B) 504 from the destination apparatus 102.5, the buffer-to-buffer credit 504 of which informs the switching apparatus 150 how many data packets the destination apparatus 102.5 can accept.

At the same time, the switching apparatus 150 tracks the time period 505 between the detection of the received data packet 502 and the receipt of the buffer-to-buffer credit 504. For subsequent data packets, such as data packet 502', the switching apparatus 150 tracks the time period 505' between the detection of the received data packet 502' and the receipt of the buffer-to-buffer credit 504'.

At 506, the switching apparatus 150 then calculates an average of the tracked time periods 505 and 505' and compares this average to a certain threshold. Based on this comparison, the switching apparatus can control flow of data packets by dropping one or more data packets 502 and/or 502' destined to destination apparatus 102.5 if needed. For example, if the switching apparatus 150 detects that the average exceeds the threshold, then the switching apparatus drops the data packets 502 and 502' to eliminate or minimize congestion on the other ports. However, if the switching apparatus 150 detects that the average falls below this threshold, then the switching apparatus 150 forwards the data packet 502 and 502' to the destination apparatus 102.5.

Figure 6:
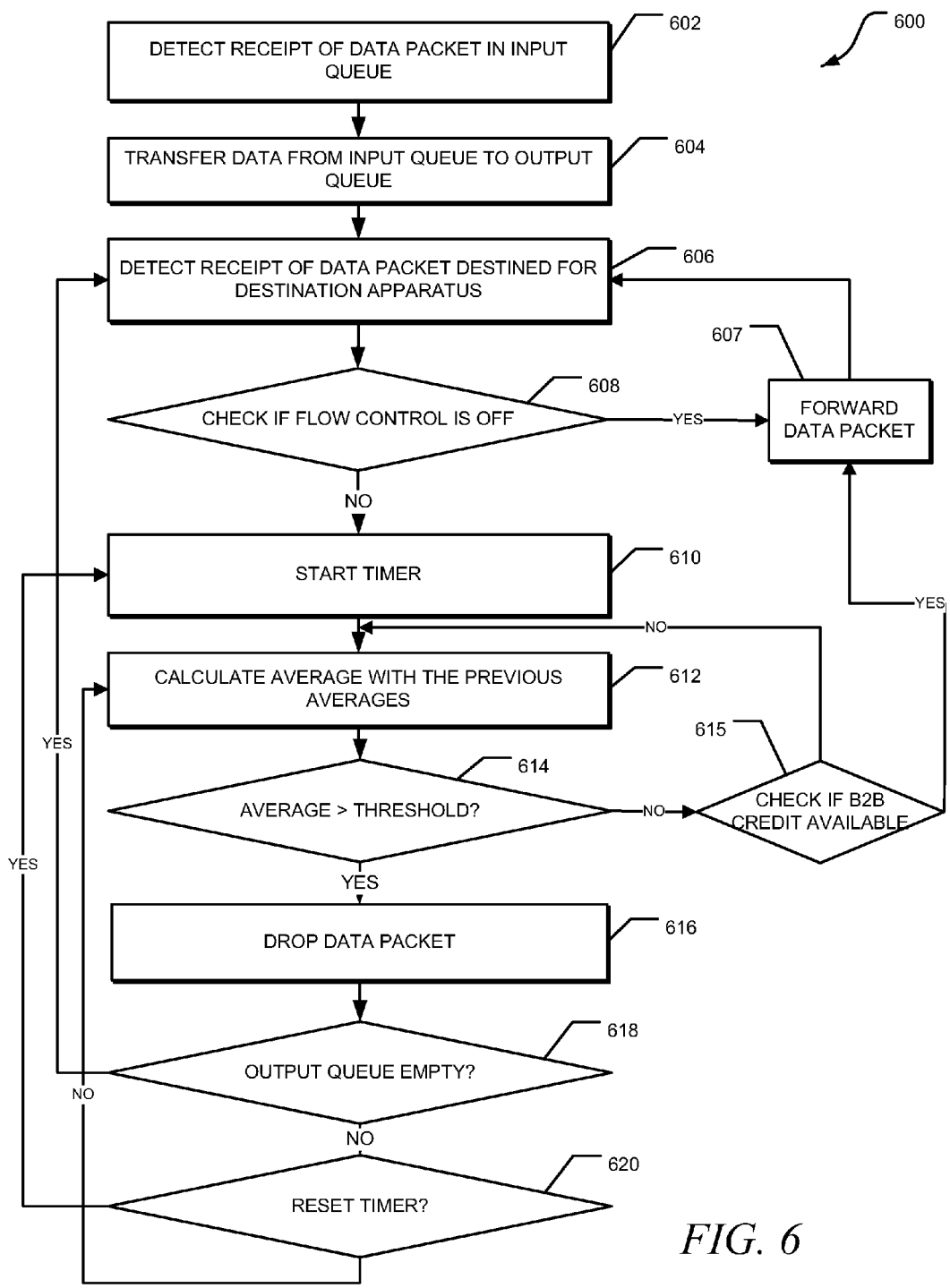
FIG. 6 is a flow diagram depicting a more detailed method, in accordance with an alternative embodiment, for congestion alleviation in a Fibre Channel network system.

FIG. 6 is a flow diagram depicting a more detailed method 600, in accordance with an alternative embodiment, for congestion alleviation in a Fibre Channel network system. In this example embodiment, the method 600 may be also implemented by the port logic module 310 and employed in the switching apparatus 150 depicted in FIG. 3.

In reference to FIG. 6, the port logic module initially detects the receipt of a data packet. For example, at 602, the port logic module can make such a detection based on detection of receipt of the data packet in an input queue associated with an input port. At 604, this data packet is then transferred from the input queue to an output queue that is associated with an output port. The transfer can be by way of a lossless mechanism. The port logic module then makes the detection of the receipt of the data packet by detecting the storage of the data packet in an output queue at 606.

Afterwards, the switching apparatus, at 608, checks if flow control is off. For example, in one embodiment, the switching apparatus can check whether a pause command has been asserted. In an alternate embodiment, the switching apparatus can check if buffer-to-buffer credit is available (or received from the destination apparatus). If buffer-to-buffer credit is available, then the port logic module forwards the data packet to the destination apparatus at 607. However, if buffer-to-buffer credit is not available, then the port logic module starts a timer, at 610, to track the time period between the detection of the data packet and the receipt of buffer-to-buffer credit. For example, the port logic module can track based on tracking a number of cycles an ASIC has a pending data packet without buffer-to-buffer credit.

The port logic module then calculates an average of the time periods. In one embodiment, the port logic module, at 612, calculates the averages with the previously calculated averages. That is, the port logic module calculates a continuously-updated average that takes into account the latest tracked time period, which is identified at 610. The port logic module then compares, at 614, the calculated average to a certain threshold, which, as described above, can be predefined based on, for example, the length of a Fibre Channel cable.

In this embodiment, if the average is less than the threshold, as determined at 614, then the port logic module checks again, at 615, to determine whether buffer-to-buffer credit is available. If buffer-to-buffer credit is available, then the port logic module forwards the data packet, at 607, to the destination apparatus. If buffer-to-buffer credit is not available, then the port logic module repeats the average calculation at 612.

On the other hand, if the port logic module, at 614, identifies that the average is greater than the threshold, then the port logic module drops the data packet at 616. The port logic module then checks, at 618, if there are other data packets in the output queue. If there are data packets in the output queue, the timer, at 620, can be reset to 0. Alternatively, the timer continues from the current value and data packets are continuously dropped until output queue becomes empty or a buffer-to-buffer credit, as an example, is received. However, if the output queue is empty, the timer can also be reset to 0.

In one embodiment, the port logic module itself can drop data packets at the output queue. However, in an alternate embodiment, the port logic module can drop the data packets at the input queue. For example, in reference to FIG. 3, the port logic module 310 can transmit a request to a queuing module 306, as depicted in FIG. 3, to drop data packets associated with a particular port. In particular, on a rising edge of a signal that identifies the average to be greater than the threshold, the port logic module 310 forwards a packet with the output port number of the slow port to all queuing modules by way of, for example, multicast fabric channels. The port logic module 310 can append or update the output port number in a payload portion of the packet, and this packet is muxed with the regular data path and sent to all downlink modules (including forwarding module).

Figure 7:
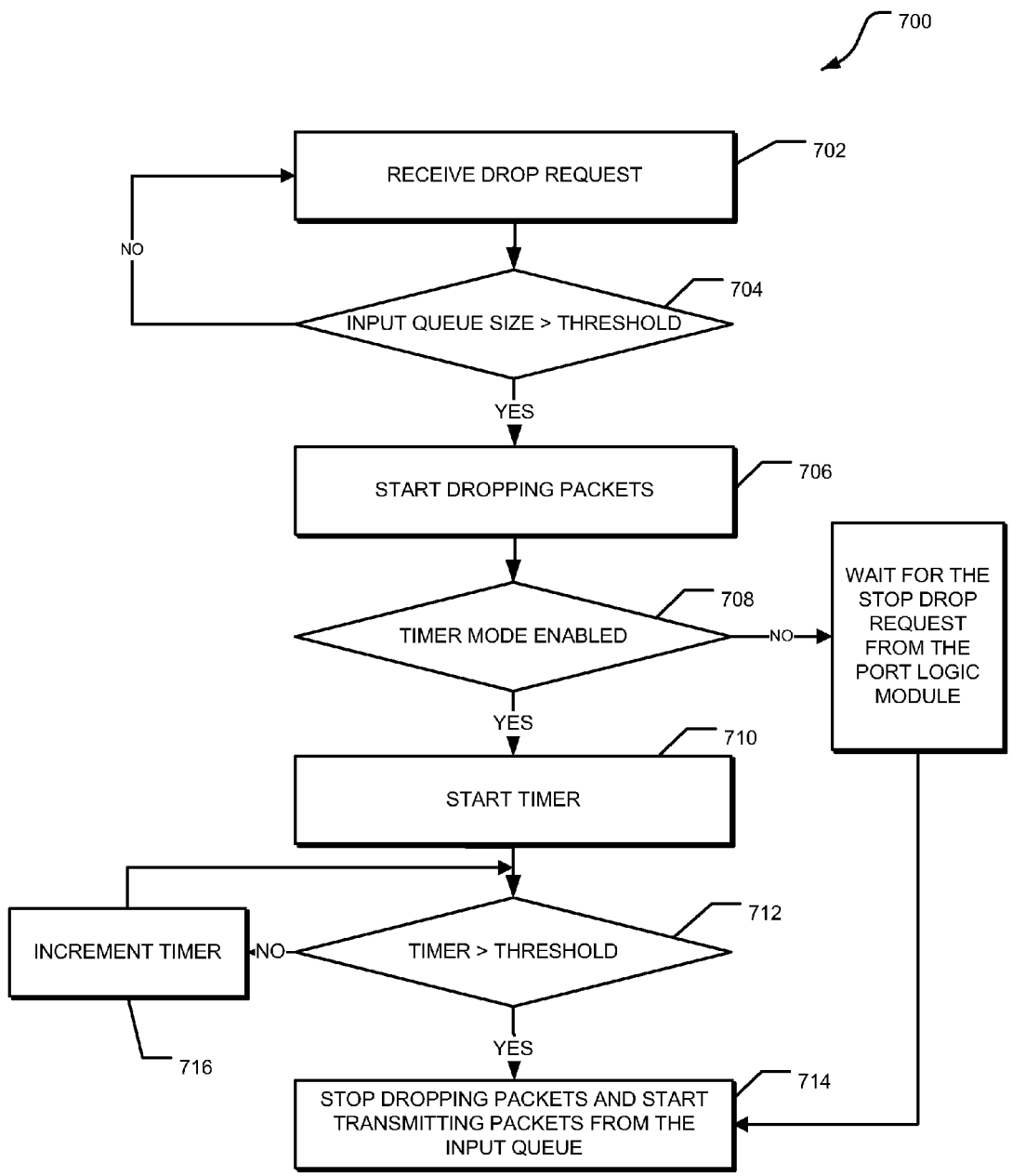
FIG. 7 is a flow diagram depicting a method, in accordance with an alternative embodiment, for dropping data packets at the input queue.

FIG. 7 is a flow diagram depicting a method 700, in accordance with an alternative embodiment, for dropping data packets at the input queue. In this example embodiment, the method 700 may be implemented by the forwarding and queuing modules 304 and 306, respectively, and employed in the switching apparatus 150 depicted in FIG. 3. Here, the forwarding module, at 702, receives a drop request from a port logic module. This drop request can be a packet with an output port number, as described above. Upon receipt of the drop request, the forwarding module 304 parses the drop request to retrieve the output port number and provide the output port number to the queuing module 306.

The queuing module, at 704, then checks whether the input queue size is greater than a threshold. If the input queue size is less than the threshold, the queuing module will not drop the data packets. However, at 706, the queuing module will drop subsequently received data packets at the input queue. For example, the queuing module can drop data packets from the head or tail of the input queue if the input queue size is greater than the threshold.

In one embodiment, the queuing module will continue to drop data packets received from the input port until the queuing module receives instructions from the port logic module to resume forwarding of data packets. In another embodiment, the queuing module can be configured to continuously drop data packets associated with a particular port as long as the queuing module receives requests on a periodic basis (e.g., heartbeat messages) from the port logic module to drop the data packets. The periodic time period can be predefined, and the queuing module can start a timer, as depicted at 708 and 710, with receipt of each data packet. If the timer does not exceed the threshold, the timer is incremented at 716. However, once the timer has expired at 712, but no requests for dropping the data packets have been received before the timer has expired, the queuing module is configured to resume forwarding of the data packets to the port logic module at 714.

Certain embodiments are described herein as including logic or a number of components, modules, or mechanisms. Modules may constitute hardware modules. A hardware module is a tangible unit capable of performing certain operations and may be configured or arranged in a certain manner. In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations. Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

While the embodiment(s) is (are) described with reference to various implementations and exploitations, it will be understood that these embodiments are illustrative and that the scope of the embodiment(s) is not limited to them. In general, techniques for congestion alleviation may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. An apparatus comprising:
an output port;
a port logic integrated circuit module in communication with the output port, the port logic integrated circuit module having instructions that cause operations to be performed, the operations comprising:
receiving a plurality of data packets destined for the output port that is in communication with a destination apparatus;
initiating a plurality of timers corresponding to the plurality of data packets, each of the plurality of timers starting when a corresponding data packet is received;
receiving, from the destination apparatus, a plurality of flow control signals, a particular flow control signal among the plurality of flow control signals corresponding to a particular data packet in the plurality of data packets, wherein the particular flow control signal stops the timer corresponding to the particular data packet, recording a time period between receiving the particular data packet and receiving the particular flow control signal;

tracking a plurality of time periods comprising the recorded time period for each of the plurality of data packets;

calculating an average of the plurality of time periods;

comparing the average to a threshold; and dropping at least one of the plurality of data packets in reference to the comparison.

2. The apparatus of claim 1, further comprising an output queuing module in communication with the port logic integrated circuit module, the output queuing module includes an output queue, and wherein the operation of receiving the plurality of data packets comprises storing the plurality of data packets in the output queue.

3. The apparatus of claim 2, wherein the operation of dropping the at least one of the plurality of data packets comprises transmitting a request to the output queuing module to drop the at least one of the plurality of data packets stored in the output queue.

4. The apparatus of claim 1, further comprising an input queue and an input queuing module in communication with the input queue and the port logic integrated circuit module, wherein the operation of dropping the at least one of the plurality of data packets comprises transmitting a request to the input queuing module to drop the at least one of the plurality of data packets communicated at the input queue.

5. The apparatus of claim 4, wherein the operation of dropping the at least one of the plurality of data packets in reference to the comparison further comprises transmitting additional requests on a periodic basis to the input queuing module.

6. The apparatus of claim 5, wherein the input queuing module having instructions that cause operations to be performed, the operations comprising resuming transmittal of additional data packets to the port logic integrated circuit module based on non-receipt of the additional requests for a predefined time period.

7. The apparatus of claim 1, wherein the plurality of flow control signals are buffer-to-buffer credits, each buffer-to-buffer credit identifying a number of data packets allowed to accumulate on the destination apparatus.

8. The apparatus of claim 1, wherein the plurality of flow control signals are a plurality of pause commands.

9. Logic encoded on one or more non-transitory, tangible media and when executed cause operations to be performed on a processor, the operations comprising:

receiving a plurality of data packets for a destination apparatus;

initiating a plurality of timers corresponding to the plurality of data packets, each of the plurality of timers starting when a corresponding data packet is received;

receiving, from the destination apparatus, a plurality of flow control signals, a particular flow control signal among the plurality of flow control signals corresponding to a particular data packet in the plurality of data packets, wherein the particular flow control signal stops the timer corresponding to the particular data packet, recording a time period between receiving the particular data packet and receiving the particular flow control signal;

tracking a plurality of time periods comprising the recorded time period for each of the plurality of data packets;

calculating an average of the plurality of time periods;

comparing the average to a threshold; and dropping at least one of the plurality of data packets in reference to the comparison.

10. The logic of claim 9, wherein the plurality of data packets is received at an input queue and wherein the plurality of data packets is dropped at the input queue.

11. The logic of claim 9, wherein the at least one of the plurality of data packets is destined for the destination apparatus by way of an output queue and wherein the at least one of the plurality of data packets is dropped at the output queue.

12. The logic of claim 9, wherein the operation of receiving the plurality of data packets comprises storing the plurality of data packets in an output queue.

13. A method comprising:

receiving a plurality of data packets for a destination apparatus;

initiating a plurality of timers corresponding to the plurality of data packets, each of the plurality of timers starting when a corresponding data packet is received;

receiving, from the destination apparatus, a plurality of flow control signals, a particular flow control signal among the plurality of flow control signals corresponding to a particular data packet in the plurality of data packets, wherein the particular flow control signal stops the timer corresponding to the particular data packet, recording a time period between receiving the particular data packet and receiving the particular flow control signal;

tracking a plurality of time periods comprising the recorded time period for each of the plurality of data packets;

calculating an average of the plurality of time periods;

comparing the average to a threshold; and dropping at least one of the plurality of data packets in reference to the comparison.

14. The method of claim 13, wherein the at least one of the plurality of data packets is received at an input queue and wherein the at least one of the plurality of data packets is dropped at the input queue.

15. The method of claim 13, wherein the at least one of the plurality of data packets is destined for the destination apparatus by way of an output queue and wherein the at least one of the plurality of data packets is dropped at the output queue.

16. The method of claim 13, wherein receiving the plurality of data packets comprises storing the plurality of data packets in an output queue.

17. The method of claim 13, wherein the at least one of the plurality of data packets is dropped based on the average exceeding the threshold.

18. The method of claim 13, wherein the at least one of the plurality of data packets is dropped based on the average being below the threshold.

19. The method of claim 13, wherein the plurality of flow control signals are buffer-to-buffer credits, each buffer-to-buffer credit identifying a number of data packets allowed to accumulate on the destination apparatus.

20. The method of claim 13, wherein the plurality of flow control signals are a plurality of pause commands.

* * * * *